(12) United States Patent  
Reichenbach et al.

(10) Patent No.: US 7,128,267 B2  
(45) Date of Patent: Oct. 31, 2006

(54) DEVICE FOR OPTICAL SCANNING OF OBJECTS, ESPECIALLY MARKINGS

(75) Inventors: Juergen Reichenbach, Emmendingen (DE); Ralf Ulrich Nuebling, Denzlingen (DE); Christoph Anselment, Waldkirch (DE); Roland Gehring, Elzach-Prechtal (DE)

(73) Assignee: Sick AG, Waldkirch (DE)

( * ) Notice: Subject to any disclaimer, the term of this patent is extended or adjusted under 35 U.S.C. 154(b) by 36 days.

(21) Appl. No.: 10/888,113

(22) Filed: Jul. 9, 2004

(65) Prior Publication Data

US 2005/0006476 A1    Jan. 13, 2005

(30) Foreign Application Priority Data

Jul. 11, 2003    (DE) ................. 103 31 467

(51) Int. Cl.  
*G02B 5/08*    (2006.01)

(52) U.S. Cl. ............ 235/462.36; 235/462.32; 235/462.39

(58) Field of Classification Search ........... 235/454, 235/462.32, 462.36, 462.39  
See application file for complete search history.

(56) References Cited

U.S. PATENT DOCUMENTS

| | | | |
|---|---|---|---|
| 4,820,911 A | * | 4/1989 | Arackellian et al. ... 235/462.22 |
| 5,206,491 A | * | 4/1993 | Katoh et al. ............. 235/462.4 |
| 5,869,827 A | * | 2/1999 | Rando ..................... 235/462.4 |
| 6,189,795 B1 | * | 2/2001 | Ohkawa et al. ........ 235/462.39 |
| 8,527,184 | | 3/2003 | Oliva |
| 6,585,161 B1 | * | 7/2003 | Acosta .................... 235/462.4 |
| 6,832,725 B1 | * | 12/2004 | Gardiner et al. ....... 235/462.21 |

FOREIGN PATENT DOCUMENTS

| | | |
|---|---|---|
| DE | 102 07 180 B4 | 5/2003 |
| EP | 0 480 642 A2 | 4/1992 |
| EP | 0 643 362 A2 | 3/1995 |

* cited by examiner

*Primary Examiner*—Jared J. Fureman  
*Assistant Examiner*—Daniel A. Hess  
(74) *Attorney, Agent, or Firm*—Townsend and Townsend and Crew LLP

(57) ABSTRACT

A device for optical scanning of markings, such as barcodes, has at least two transmitters (10, 20) that send light beams (12, 22) at different angles toward a rotating polygonal mirror (30), which deflects the light beams onto the markings being scanned. The light reflected by the markings is deflected by the polygonal mirrors (30) to separate receiver systems, so that the device has and simultaneously uses at least two separate transmitter/receiver channels.

20 Claims, 4 Drawing Sheets

DEVICE FOR OPTICAL SCANNING OF OBJECTS, ESPECIALLY MARKINGS

BACKGROUND OF THE INVENTION

The invention concerns a device for the optical scanning of objects, especially markings, with an apparatus that has first and second transmitters emitting respective first and second light beams, a rotatable polygonal mirror which directs the light beams onto the marking and which deflects light reflected by the markings, and a receiver system for receiving the reflected light.

A device of this kind, a so-called scanner, is known from EP 0 480 348 A1. In that device, the light beams from two transmitters, especially lasers, are deflected by a semitransparent mirror into a common beam direction and strike a rotating polygonal mirror which directs the light beams onto the markings being scanned, such as a barcode. The light returned by the markings is deflected by the polygonal mirror to a common receiver system. The two transmitters have different focal distances so as to be able to scan and read markings at different distances from the device. The two transmitters are at first alternatingly operated, in order to establish which focal distance corresponds to the distance from the markings being scanned. After this, only the transmitter which has the appropriate distance is used to scan and read the marking. The two transmitters with different focal distance give the device an improved field depth.

U.S. Pat. No. 6,527,184 B1 discloses a device with two pairs of transmitters of the kind familiar from EP 0 480 348 A1. The light beams of the respective two pairs of transmitters, coinciding in a common axis, are in different planes which are offset from each other in the direction of the axis of rotation of the polygonal mirror. This is supposed to equalize the parallax which can occur in the case of different distances.

EP 0 643 362 A1 discloses a device in which the light beam of a transmitter is deflected by a rotating polygonal mirror and an angular mirror onto the marking being scanned. The two mirror planes of the angular mirror that are oriented at an angle to each other deflect the scanning plane of the light beam into two intersecting scanning planes, through which the light beam passes in succession. There is only one receiving system, which evaluates the information from the successively traveled scanning plane. Scanning in two intersecting planes enables an omnidirectional reading of a barcode or line code.

BRIEF SUMMARY OF THE INVENTION

It is an object of the invention to provide a device of the kind mentioned at the outset, which is readily adapted for different uses and is of a simple construction.

This problem is solved according to the invention by arranging the first and second transmitters of the scanning apparatus so that the first and second light beams are angularly inclined with respect to each other and are directed towards the polygonal mirror. The receiver system includes first and second receivers which respectively receive the first and second light beams to form first and second, separate transmitter/receiver channels.

A principal aspect of the invention is to combine two transmitter/receiver channels in a device with a single common rotating polygonal mirror for optically scanning the markings. The light beams of the two transmitters are at an angle with respect to each other, and they are directed towards the rotating polygonal mirror. As a result, the two transmitter/receiver channels can scan the markings independently of each other.

For purposes of the invention, light means any optical radiation such as, for example, infrared radiation, visible light, or ultraviolet radiation.

Scanning the marking with two separate transmitter/receiver channels permits giving the devices a variety of different configurations and flexibly adapts the devices for different requirements.

Since the light beams of the two transmitter/receiver channels strike the mirror surfaces of the polygonal mirror at different angles, the scanning by the two transmitter/receiver channels is phase offset. If the two transmitter/receiver channels are identically constructed, the scanning frequency is doubled as compared to conventional scanners having only one transmitter/receiver channel.

In another application, the focal lengths of the two transmitter/receiver channels is different or is adjustable via an autocollimation system. In this way, the field depth region of the device can be correspondingly increased. It is also possible to first set two transmitter/receiver channels to different focal lengths, in order to detect the actual distance of the marking being scanned, and then focus both transmitter/receiver channels on the determined distance of the marking in order to double scanning frequency.

The omnidirectional scanning of a barcode makes scanning largely independent of the angle at which the scanning line of the scanner moves in relation to the lines of the barcode. For such an omnidirectional scanning, it is advantageous that the focal spot of the scanning light beam is as circularly round as possible. If barcodes with poor print quality are scanned (e.g. barcodes made by inkjet printers), it is advantageous for the scanning light spot to have a larger dimension in the direction parallel to the course of the lines of the barcode, e.g. to have an elliptical shape. These contradictory requirement(s) can be reconciled, according to the invention, in one device by configuring one transmitter/receiver channel with a circular round focal spot and the other transmitter/receiver channel with an oblong, e.g. elliptical, focal spot. If the transmitters of both channels are provided with a diaphragm adjustment, when needed it is also possible to operate both channels in the same operating modes (diaphragm setting), so as to again scan at twice the scan rate in the selected operating mode.

The laser diodes preferably used as the light source of the transmitters will often have a non-round, particularly a rectangular, emitting surface. This results in an astigmatism during focusing, i.e. a different focal length in the plane of the longer axis than that in the plane of the shorter axis of the laser diode. By arranging the laser diodes of the two scanning channels rotated by 90° relative to each other, this astigmatism can be used to either increase the field depth range of the entire device or, for example, to generate elliptical focal spots of the two scanning channels which have differently oriented axes of the ellipses.

In many cases, the markings being optically scanned have a surface reflection making it difficult to discriminate between the light intensity reflected by the markings and that reflected by the background. This is the case, for example, with codes which are covered by a transparent foil or layer. In such cases, the device is advantageously configured such that the two transmitter/receiver channels operate at different light polarizations, for example with cross linear or a circular polarization. This enables a differentiation between a surface reflection by the markings and a diffuse reflection by the background, even when the light intensities are the same.

The transmitter/receiver channels can be operated with light of the same or different wavelengths. Different wavelengths can be of advantage, for example, when scanning markings with different contrast, i.e. with maximum contrast at different wavelengths.

With the light beams of the two transmitter/receiver channels offset by an angle from each other, a stereometric evaluation of the signals from the two channels is possible. Since the transmitters of the two channels have a known defined distance from each other, it is possible to assign a distance information to the value of each reflection angle of the light in the two channels received from the scanned surface region of the object. From these values, two-dimensional or three-dimensional surface pictures of the scanned object can be obtained in a stereometric evaluation.

Since the scanning of the objects by the two scanning channels may overlap in some areas, it is advisable to separate the transmitter/receiver channels at the receiver side.

The separation of the transmitter/receiver channels on the receiver-side can be accomplished in various ways. A separation by selective collimation of the transmitter/receiver channels is possible. Such a variable collimation can be accomplished with known opto-mechanical systems in the transmitter/receiver channels. An additional separation of the channels at the receiver side, or even one which is independent of the collimation, is possible by modulating the transmitters at different frequencies and/or operating the transmitters at different wavelengths, particularly laser wavelengths. A separation of the channels is also possible by operating the two channels with perpendicular linear polarized light. In such cases, the receivers are respectively tuned to the transmitter modulation frequency, the transmitter wavelength, or the transmitter polarization.

The present invention is of course not limited to the just described operating modes. It can also be dynamically switched from one operating mode to another, especially under software control. Such a dynamic or adaptive switching can occur in various ways. For example, the scanning information from the one channel can be used to obtain an optimized scanning or signal processing for the following scans of both channels. This can consist of repeating the focusing or the diaphragm adjustment of the transmitter optics, as already mentioned above. The optimized setting can be kept for the entire scanning process. It is also possible to record and save a scanning profile, such as a distance profile, during one scan and then have the transmitter optics repeat the stored profile during the next scan.

Furthermore, the signal processing electronics can be optimized on the basis of information obtained during scanning. It is also possible to adjust the software controls, for example on the basis of the information obtained during the scanning process.

The different transmitter/receiver channels of the device can moreover operate with different electrical or electronic signal processing systems connected to them. The signal processing of the two channels can include different filters, different conversions into binary signals, or other signal processing measures.

Furthermore, the different scan channels can be operated with different code recognition techniques. For example, signals can be evaluated using different software or with different code recognition parameters. One such important application is inverse coding. The dark markings on light background can be scanned and read with one of the transmitter/receiver channels, and an inverse code with light markings on dark background can be read and scanned with the other transmitter/receiver channel.

DETAILED DESCRIPTION OF THE INVENTION

Figure 1:
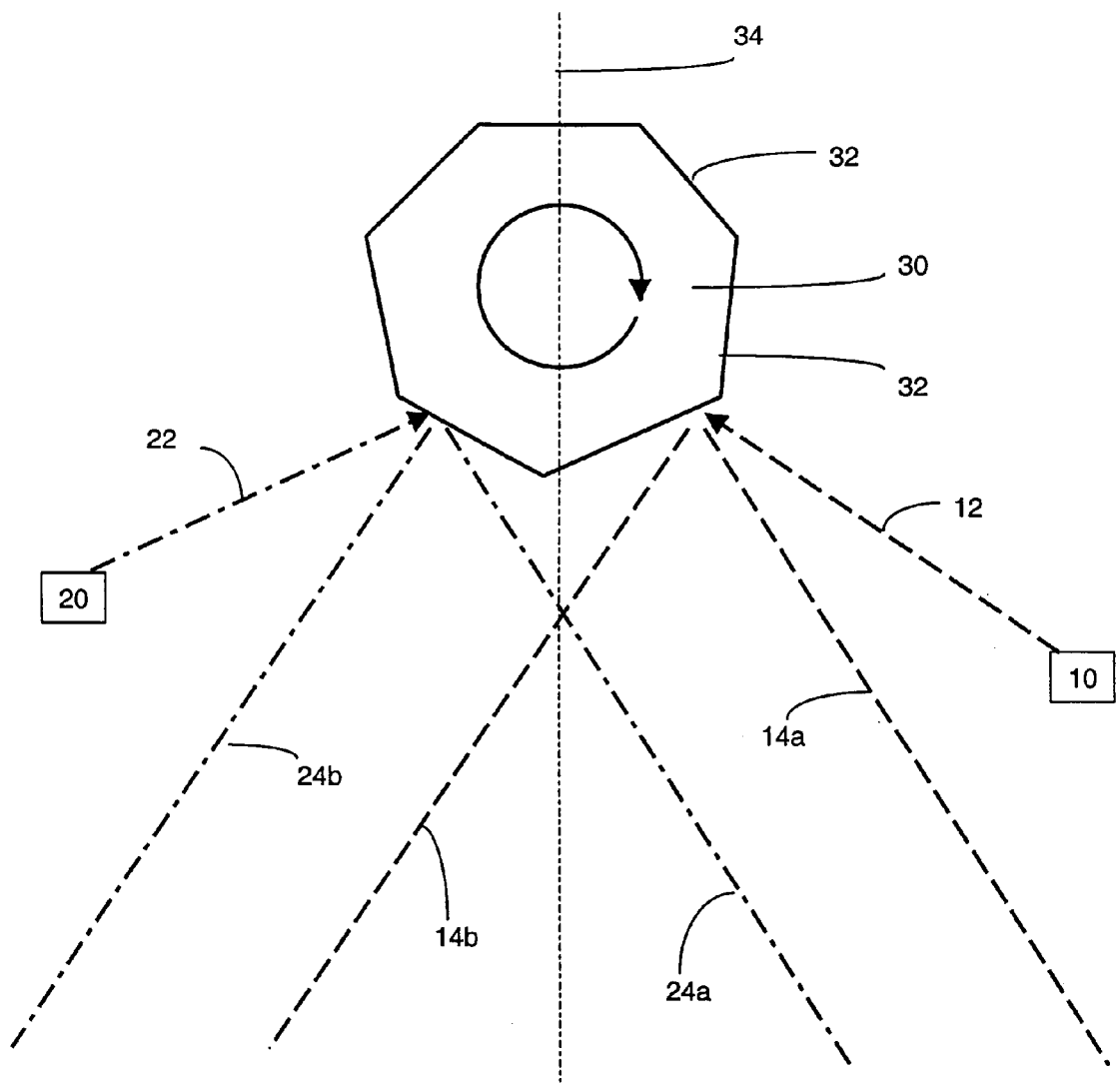
FIG. 1 schematically illustrates the present invention.

FIG. 1 shows schematically the basic principle of the invention.

A first transmitter 10 consists, in known manner, of a light source, e.g. a laser and an optical focusing system. The transmitter 10 directs a light beam 12 onto a rotating polygonal mirror 30. The light beam 12 is reflected by mirror surfaces 32 of the polygonal mirror 30 and deflected in fan-like fashion in a scanning plane by a scanning angle according to the rotation of the polygonal mirror 30. As the scanning light beam 14 passes over each mirror surface 32, it subtends an angular range between a minimum deflection angle 14a and a maximum deflection angle 14b. The scanning light beam 14 passes over a marking being scanned, such as a barcode, which reflects it back to the polygonal mirror 30, where mirror surface 32 directs it to a receiver system (not shown), which, as is known, will typically have an opto-electronic transducer coupled to a signal processor.

A second transmitter 20, which also has a light source, preferably a laser, and an optical focusing system, directs a light beam 22 to the same rotating polygonal mirror 30. Light beam 22 of second transmitter 20 is reflected by mirror surfaces 32 of the polygonal mirror and sweeps over an angular range from angle 24a to angle 24b as the mirror rotates.

As is seen in FIG. 1, the transmitters 10 and 20 are arranged so that their light beams 12 and 22 are directed at the polygonal mirror 30 from different angles. In other words, light beam 22 of second transmitter 20 is angularly offset from the light beam 12 of the first transmitter 10 in the rotational direction of the polygonal mirror 30. Preferably, the first transmitter 10 and the second transmitter 20 are arranged in a common plane perpendicular to the axis of rotation of the polygonal mirror 30, so that the scanning light beams 14 and 24 of the two transmitters 10 and 20 scan the object with the marking in a common plane, which corresponds to the plane of the drawing in FIG. 1. However, according to the invention it is not necessary for the scanning planes of the two transmitters 10 and 20 to lie in the same plane. It is equally possible for the scanning planes of the first transmitter 10 and the second transmitter 20 to be arranged in different planes, parallel to each other and displaced from each other in the direction of the axis of rotation of polygonal mirror 30.

As shown in FIG. 1, transmitters 10 and 20 are preferably arranged so that the direction of their light beams 12 and 22 is in mirror symmetry to a plane of symmetry 34 which includes the axis of rotation of polygonal mirror 30. The polygonal mirror preferably has odd or uneven mirror sections; i.e. it has five, seven, nine, etc. mirror surfaces 32 arranged at identical angular division. The sample embodiment shown in FIG. 1 shows a polygonal mirror 30 with seven mirror surface sections 32.

The separation of the receiver systems of the first transmitter 10 and the second transmitter 20 can occur in various ways. A mechanical-structural separation by different focusing of the two transmitter/receiver channels is possible. Such focusing can occur by means of an autocollimation. Such focusing systems and especially autocollimation systems are known. Furthermore, the first and second transmitters 10 and 20 can be modulated with different frequency. In such an event, the respective receiver systems are tuned to the chosen modulation frequency of the respective transmitters 10 and 20. The transmitter/receiver channels can also be operated at different wavelengths, in particular at different laser wavelengths for the transmitters 10 and 20. Here as well, the receiver systems are tuned to the appropriate wavelengths. Or, the transmitters 10 and 20 can emit linearly polarized light, with the planes of polarization arranged perpendicular to each other. The receiver systems then use corresponding polarization filters.

Figure 2:
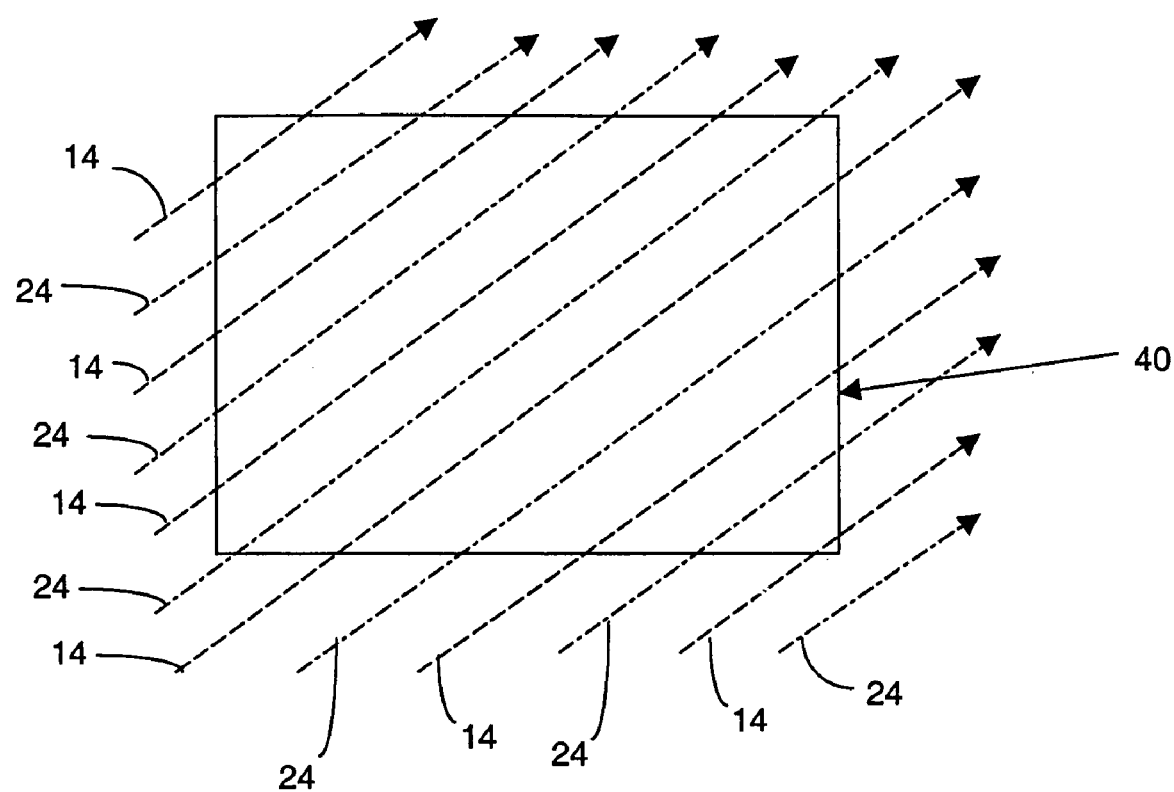
FIG. 2 illustrates scanning of a marking at twice the scan frequency.

When the transmitters 10 and 20 are arranged in mirror symmetry to each other and in the same plane, as is shown in FIG. 1, light beams 14 and 24 of the two transmitter/receiver channels scan an object which carries a marking 40 to be scanned, such as a barcode, in a common plane. The scanning beams 14 and 24 of the transmitters pass through the scanning plane with a time phase shift relative to each other. In the symmetrical arrangement and with an uneven mirror sectioning as is shown in FIG. 1, the phase shift is precisely 50%. That is, in the region of overlap of scanning beams 14 and 24, scanning beam 24 lags scanning beam 14 by 50%, and vice versa. As the scan marking 40 moves through the scan device or as the scan device is moved across the scan marking 40, a scanning of the marking by the scanning beams 14 and 24 occurs as is shown in FIG. 2. The marking 40 is scanned at twice the scan rate compared to scanning it with only one light beam, and the scan lines of the second transmitter/receiver channel lie precisely between the scan lines of the first transmitter/receiver channel, as is shown in FIG. 2 by dash scan lines 14 for the first channel and dash-dot scan lines 24 for the second channel.

Figure 3:
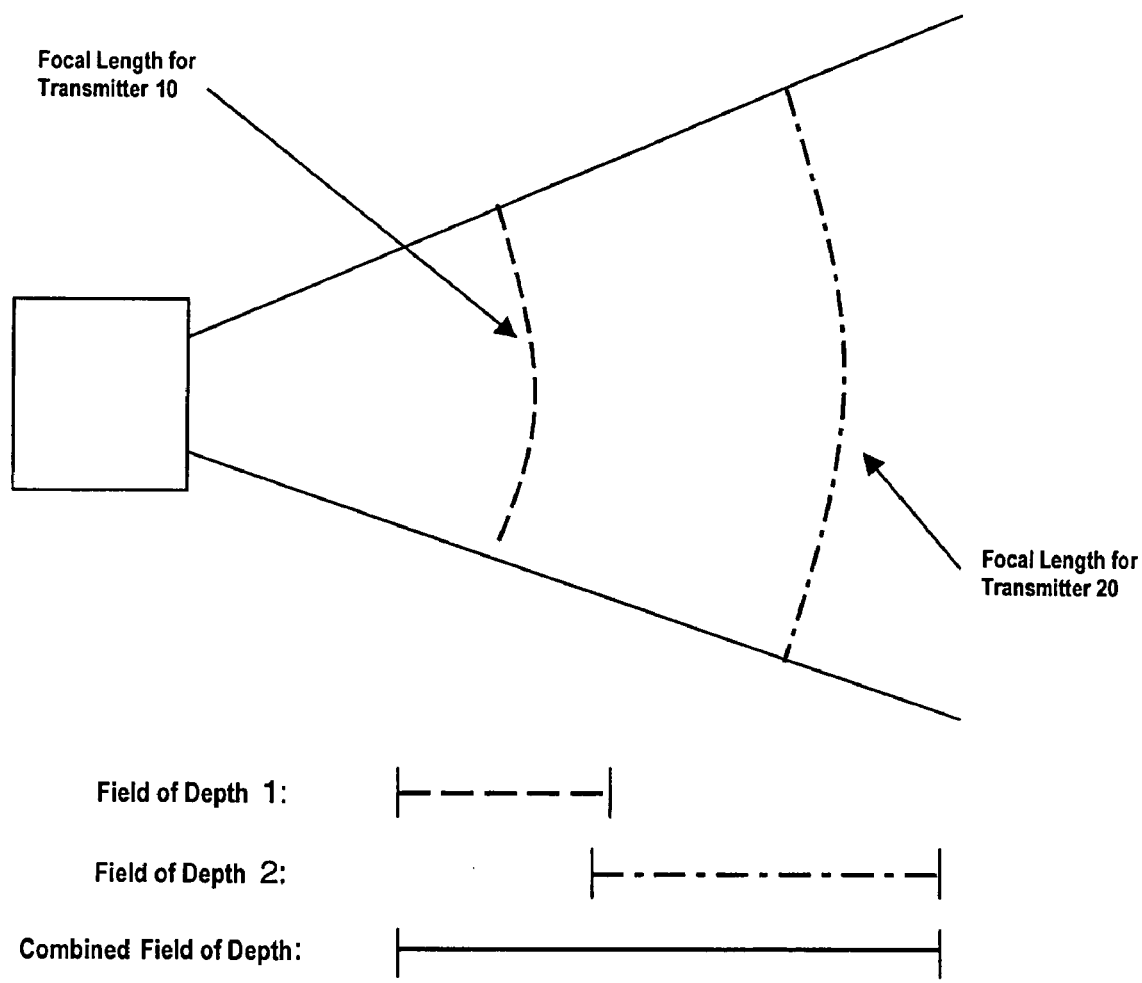
FIG. 3 illustrates scanning of a marking with enhanced field depth.

FIG. 3 schematically shows an embodiment of the invention in which the first transmitter/receiver channel and the second transmitter/receiver channel are adjusted to different focal lengths. The focus of the first transmitter/receiver channel is again shown by dashes and the focus of the second transmitter/receiver channel by dash-dot lines. The bottom of FIG. 3 shows the field of depth range for the two channels and the overall field of depth range of the device resulting from the overlap of the field depth ranges.

Figure 4:
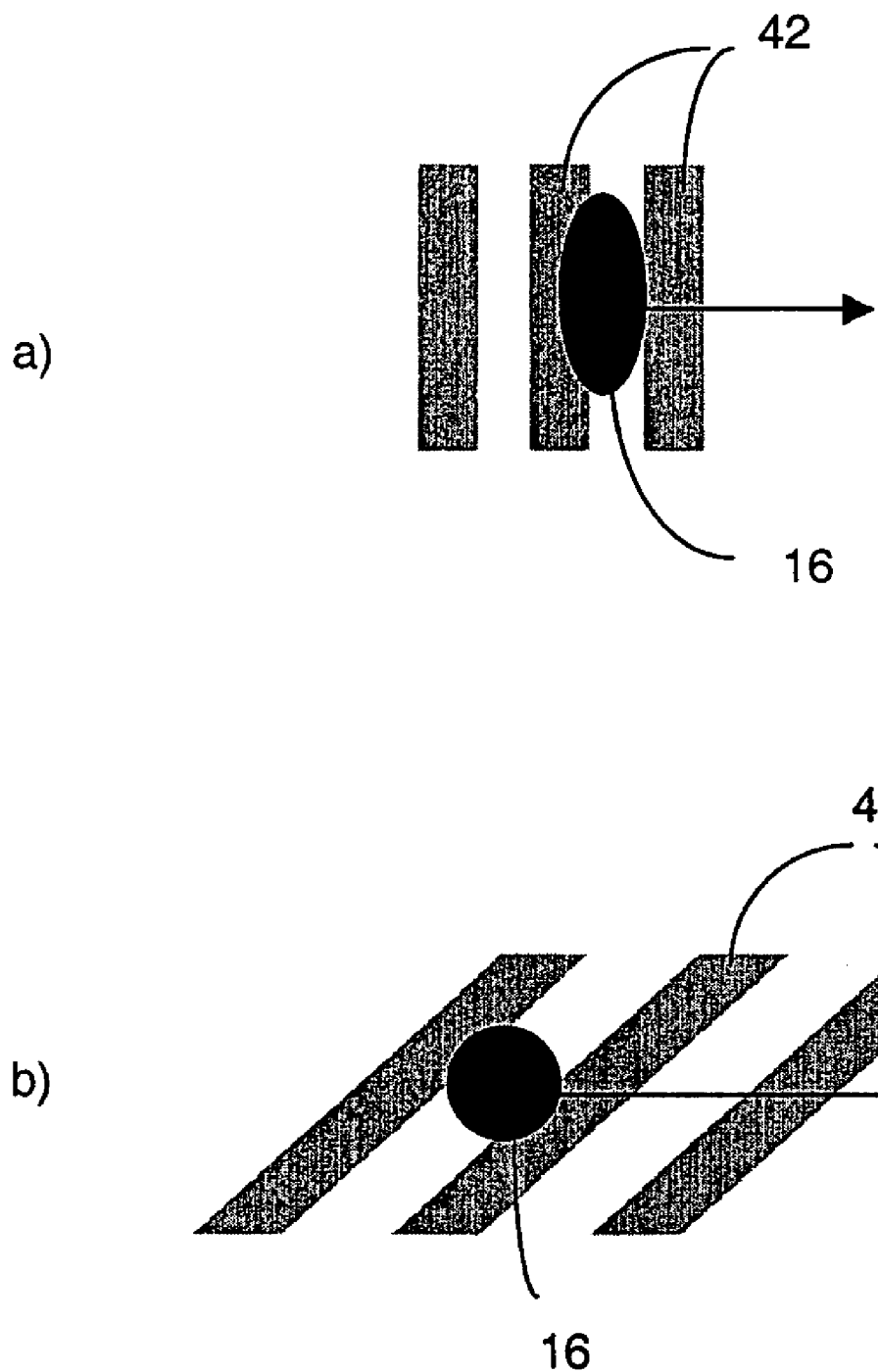
FIG. 4 illustrates scanning with different shapes of focal spot.

FIG. 4 shows the device of the present invention using differently shaped focal spots 16. FIG. 4a shows an elongated, e.g. elliptical, shape of the focal spot 16. This focal spot 16 shape is especially suitable for scanning barcodes 42 having poor print quality. The larger axis of the elliptical focal spot 16 runs parallel to the lines of the barcode 42, so that the scanning over a larger length region of the lines produces an improved contrast.

FIG. 4b shows a round circular focal spot 16. A round circular focal spot 16 is advisable when the direction of travel of the barcode 42, as indicated by an arrow in FIG. 4, does not have a definite angle in relation to the scanning of the barcode. Since there is no preferred orientation with respect to the barcode direction, a circular shape of the focal spot 16 is advantageous for omnidirectional scanning.

Of course, the invention is not confined to the use of two separate transmitter/receiver channels. One can also use more than two separate transmitter/receiver channels. These channels can each be arranged at a different angle to the rotating polygonal mirror. It is likewise possible to arrange the transmitter/receiver channels in different planes relative to the axis of rotation of the polygonal mirror. Furthermore, it is possible to arrange several transmitter/receiver channels at the same angle, but in different planes that are set off parallel in the direction of the axis of rotation.

What is claimed is:

1. Apparatus for optically scanning a marking, comprising first and second transmitters emitting respective first and second light beams, a rotatable polygonal mirror which deflects the light beams onto the marking and which reflects light reflected by the markings, a receiver system for receiving the reflected light, the first and second transmitters and the polygonal mirror being arranged so that the first and second light beams emitted by the transmitters and reflected by the polygonal mirror are in a common plane that is perpendicular to an axis of rotation, are angularly inclined with respect to each other, and are directed towards the polygonal mirror, the receiver system including first and second receivers which respectively receive the first and second light beams to thereby form first and second, separate transmitter/receiver channels.

2. Apparatus according to claim 1 wherein the transmitters are arranged so that the first and second light beams are in mirror symmetric relation to a plane that includes an axis of rotation of the polygonal mirror.

3. Apparatus according to claim 1 wherein the polygonal mirror has an uneven number of mirror surfaces.

4. Apparatus according to claim 1 including a separate focusing system for each transmitter/receiver channel.

5. Apparatus according to claim 4 wherein the focusing system of at least one transmitter/receiver channel comprises a mechanical autocollimation system.

6. Apparatus according to claim 1 including a different diaphragm for each transmitter/receiver channel for shaping focal spots of the first and second light beams.

7. Apparatus according to claim 1 including a different light polarizer for each transmitter/receiver channel.

8. Apparatus according to claim 1 wherein the transmitters and the receivers of the respective transmitter/receiver channels operate at different modulation frequencies.

9. Apparatus according to claim 1 wherein the transmitters and receivers of the respective transmitter/receiver channels operate at different light wavelengths.

10. Apparatus according to claim 1 wherein the first and second transmitters each have an astigmatism, and are rotationally offset relative to each other relative to the direction of the respective first and second light beams.

11. Apparatus according to claim 1 wherein the first and second transmitter/receiver channels alternatingly scan the marking.

12. Apparatus according to claim 1 wherein the first and second transmitter/receiver channels scan the marking with different focal distances from the respective transmitters.

13. Apparatus according to claim 1 including a different electronic signal processor for each transmitter/receiver channel.

14. Apparatus according to claim 1 wherein the first and second transmitter/receiver channels employ different code recognition methods.

15. Apparatus according to claim 1 wherein signals generated by the first transmitter/receiver channel are used to repeat a parameter of the second transmitter/receiver channel.

16. Apparatus for optically scanning a marking, comprising first and second transmitters emitting respective first and second light beams, a rotatable polygonal mirror which deflects the light beams onto the marking and which reflects light reflected by the markings, a receiver system for receiving the reflected light, the first and second transmitters being arranged so that the first and second light beams are angularly inclined with respect to each other and are directed towards the polygonal mirror, the receiver system including first and second receivers which respectively receive the first and second light beams to thereby form first and second, separate transmitter/receiver channels, and a different diaphragm for each transmitter/receiver channel for shaping focal spots of the first and second light beams.

17. Apparatus for optically scanning a marking, comprising first and second transmitters emitting respective first and second light beams, a rotatable polygonal mirror which deflects the light beams onto the marking and which reflects light reflected by the markings, a receiver system for receiving the reflected light, the first and second transmitters being arranged so that the first and second light beams are angularly inclined with respect to each other and are directed towards the polygonal mirror, the receiver system including first and second receivers which respectively receive the first and second light beams to thereby form first and second, separate transmitter/receiver channels, the transmitters and the receivers of the respective transmitter/receiver channels operating at different modulation frequencies.

18. Apparatus for optically scanning a marking, comprising first and second transmitters emitting respective first and second light beams, a rotatable polygonal mirror which deflects the light beams onto the marking and which reflects light reflected by the markings, a receiver system for receiving the reflected light, the first and second transmitters being arranged so that the first and second light beams are angularly inclined with respect to each other and are directed towards the polygonal mirror, the receiver system including first and second receivers which respectively receive the first and second light beams to thereby form first and second, separate transmitter/receiver channels, wherein the first and second transmitters each have an astigmatism and are rotationally offset relative to each other relative to the direction of the respective first and second light beams.

19. Apparatus for optically scanning a marking, comprising first and second transmitters emitting respective first and second light beams, a rotatable polygonal mirror which deflects the light beams onto the marking and which reflects light reflected by the markings, a receiver system for receiving the reflected light, the first and second transmitters being arranged so that the first and second light beams are angularly inclined with respect to each other and are directed towards the polygonal mirror, the receiver system including first and second receivers which respectively receive the first and second light beams to thereby form first and second, separate transmitter/receiver channels, wherein the first and second transmitter/receiver channels employ different code recognition methods.

20. Apparatus according to claim 18 wherein the transmitters are arranged so that the first and second light beams are in a common plane that is perpendicular to an axis of rotation of the polygonal mirror.

* * * * *